United States Patent
Eikelenberg et al.

(10) Patent No.: US 9,631,940 B2
(45) Date of Patent: Apr. 25, 2017

(54) METHOD AND SYSTEM FOR DETERMINING A ROUTE FOR EFFICIENT ENERGY CONSUMPTION

(75) Inventors: Nicole Leonarda Wilhelmina Eikelenberg, Meerssen (NL); Ulf Kirchner, Hauset (BE); Christoph Arndt, Moerlen (DE); Servé Ploumen, Geulle (NL)

(73) Assignee: Ford Global Technologies, LLC, Dearborn, MI (US)

( * ) Notice: Subject to any disclaimer, the term of this patent is extended or adjusted under 35 U.S.C. 154(b) by 1276 days.

(21) Appl. No.: 13/158,866

(22) Filed: Jun. 13, 2011

(65) Prior Publication Data

US 2011/0309926 A1 Dec. 22, 2011

(30) Foreign Application Priority Data

Jun. 21, 2010 (DE) .................. 10 2010 030 309

(51) Int. Cl.
  *B60Q 1/00* (2006.01)
  *G01C 21/34* (2006.01)
  *B60L 1/00* (2006.01)

(52) U.S. Cl.
  CPC ............ *G01C 21/3469* (2013.01); *B60L 1/00* (2013.01)

(58) Field of Classification Search
  CPC ................................. B60L 1/00; B60W 10/00
  USPC ........ 340/439, 539.18, 988; 701/1, 123, 410
  See application file for complete search history.

(56) References Cited

U.S. PATENT DOCUMENTS

| | | | |
|---|---|---|---|
| 5,202,617 A | 4/1993 | Nor | |
| 5,301,113 A | 4/1994 | To et al. | |
| 5,539,399 A | 7/1996 | Takahira et al. | |
| 5,686,895 A | 11/1997 | Nakai et al. | |
| 5,790,976 A | 8/1998 | Boll et al. | |
| 5,892,346 A | 4/1999 | Moroto et al. | |
| 5,913,917 A * | 6/1999 | Murphy ........................ | 701/123 |

(Continued)

FOREIGN PATENT DOCUMENTS

| | | |
|---|---|---|
| DE | 102007059120 A1 | 6/2009 |
| DE | 102007059121 A1 | 6/2009 |

(Continued)

OTHER PUBLICATIONS

Ford Motor Company, "SYNC with Navigation System," Owner's Guide Supplement, SYNC System Version 1 (Jul. 2007).

(Continued)

*Primary Examiner* — Shirley Lu
(74) *Attorney, Agent, or Firm* — Jennifer Stec; Brooks Kushman P.C.

(57) ABSTRACT

Various embodiments relate to determining a route for efficient energy consumption. Data defining one or more routes and one or more consumption influencing parameters which influence a consumption of an energy source of the vehicle along the one or more routes may be received at a vehicle computer. Based on the route data and the consumption influencing parameters, at least one route which minimizes the consumption of the energy source for the vehicle may be determined. For the at least one route, one or more braking strategies may be determined for implementation by a vehicle operator in the vehicle in accordance with reducing the consumption of the vehicle energy source. The one or more braking strategies may be output in the vehicle.

16 Claims, 3 Drawing Sheets

(56) References Cited

U.S. PATENT DOCUMENTS

| | | |
|---|---|---|
| 5,916,298 A | 6/1999 | Kroiss et al. |
| 6,005,494 A | 12/1999 | Schramm |
| 6,198,995 B1 | 3/2001 | Settles et al. |
| 6,337,621 B1 | 1/2002 | Ogino et al. |
| 6,591,185 B1 | 7/2003 | Polidi et al. |
| 6,836,728 B2 | 12/2004 | Shimabara |
| 6,864,807 B2 | 3/2005 | Todoriki et al. |
| 6,947,732 B2 | 9/2005 | Fraser |
| 7,127,350 B2 | 10/2006 | Oikubo |
| 7,142,664 B2 | 11/2006 | Seligmann |
| 7,149,623 B2 | 12/2006 | Flick |
| 7,277,780 B2 | 10/2007 | Meier-Arendt et al. |
| 7,346,630 B2 | 3/2008 | Eichstaedt et al. |
| 7,402,978 B2 | 7/2008 | Pryor |
| 7,433,714 B2 | 10/2008 | Howard et al. |
| 7,444,384 B2 | 10/2008 | Horvitz |
| 7,586,956 B1 | 9/2009 | Mishra et al. |
| 7,668,644 B2 | 2/2010 | Tengler et al. |
| 7,873,466 B2 | 1/2011 | Kong |
| 7,925,426 B2 | 4/2011 | Koebler et al. |
| 8,000,842 B2 | 8/2011 | Yi et al. |
| 8,005,453 B2 | 8/2011 | Van Bosch et al. |
| 8,103,434 B2 | 1/2012 | Helbing et al. |
| 8,239,127 B2 | 8/2012 | Kono et al. |
| 8,255,152 B2 | 8/2012 | Barth et al. |
| 8,284,039 B2 | 10/2012 | Baker et al. |
| 8,290,695 B2 | 10/2012 | Hiestermann et al. |
| 8,290,701 B2 | 10/2012 | Mason et al. |
| 8,294,286 B2 | 10/2012 | Hunter |
| 8,401,792 B2 | 3/2013 | Yeh et al. |
| 8,478,642 B2 | 7/2013 | Dey et al. |
| 8,504,236 B2 | 8/2013 | Guo et al. |
| 2002/0164998 A1 | 11/2002 | Younis |
| 2003/0023374 A1 | 1/2003 | Shimabara |
| 2004/0073643 A1 | 4/2004 | Hayes et al. |
| 2004/0162669 A1 | 8/2004 | Nagamasa |
| 2004/0243307 A1 | 12/2004 | Geelen |
| 2005/0080552 A1 | 4/2005 | Feldman et al. |
| 2006/0002413 A1 | 1/2006 | Tsutazawa et al. |
| 2006/0007022 A1 | 1/2006 | Endo et al. |
| 2006/0290490 A1 | 12/2006 | Kraus et al. |
| 2007/0052552 A1 | 3/2007 | Suzuki |
| 2007/0112475 A1 | 5/2007 | Koebler et al. |
| 2007/0150171 A1 | 6/2007 | Tengler et al. |
| 2007/0271035 A1 | 11/2007 | Stoschek et al. |
| 2008/0027606 A1 | 1/2008 | Helm |
| 2008/0042489 A1* | 2/2008 | Lewis et al. ............ 303/152 |
| 2009/0021218 A1 | 1/2009 | Kelty et al. |
| 2009/0099992 A1 | 4/2009 | Horvitz |
| 2009/0110163 A1 | 4/2009 | Gupta |
| 2009/0119385 A1 | 5/2009 | Horvitz |
| 2009/0138188 A1 | 5/2009 | Kores et al. |
| 2009/0141173 A1 | 6/2009 | Pugel |
| 2009/0265099 A1 | 10/2009 | Gottlieb |
| 2009/0309709 A1 | 12/2009 | Bevacqua et al. |
| 2010/0017249 A1 | 1/2010 | Fincham et al. |
| 2010/0060016 A1 | 3/2010 | Hunter |
| 2010/0070253 A1 | 3/2010 | Hirata et al. |
| 2010/0076675 A1 | 3/2010 | Barth et al. |
| 2010/0094496 A1 | 4/2010 | Hershkovitz et al. |
| 2010/0106514 A1 | 4/2010 | Cox |
| 2010/0106603 A1 | 4/2010 | Dey et al. |
| 2010/0110077 A1 | 5/2010 | Grossman et al. |
| 2010/0131188 A1 | 5/2010 | Yeh et al. |
| 2010/0138142 A1 | 6/2010 | Pease |
| 2010/0169008 A1 | 7/2010 | Niwa et al. |
| 2010/0207772 A1 | 8/2010 | Yamamoto |
| 2010/0235076 A1 | 9/2010 | Ofek et al. |
| 2010/0237985 A1 | 9/2010 | Landau-Holdsworth et al. |
| 2010/0256830 A1 | 10/2010 | Kressner et al. |
| 2010/0274689 A1 | 10/2010 | Hammad et al. |
| 2010/0286909 A1 | 11/2010 | Tate, Jr. et al. |
| 2011/0040438 A1 | 2/2011 | Kluge et al. |
| 2011/0060495 A1 | 3/2011 | Kono et al. |
| 2011/0060517 A1 | 3/2011 | Kono et al. |
| 2011/0191265 A1 | 8/2011 | Lowenthal et al. |
| 2011/0238457 A1 | 9/2011 | Mason et al. |
| 2011/0251789 A1 | 10/2011 | Sanders et al. |
| 2011/0307166 A1 | 12/2011 | Hiestermann et al. |
| 2012/0016551 A1 | 1/2012 | Krause et al. |
| 2012/0016576 A1 | 1/2012 | Huang et al. |
| 2012/0022904 A1 | 1/2012 | Mason et al. |
| 2012/0029800 A1 | 2/2012 | Kluge et al. |
| 2012/0065831 A1 | 3/2012 | Ross et al. |
| 2012/0158299 A1 | 6/2012 | Cerecke et al. |
| 2012/0179315 A1 | 7/2012 | Tate et al. |
| 2012/0179362 A1 | 7/2012 | Stille |
| 2012/0232783 A1 | 9/2012 | Calkins et al. |
| 2012/0271542 A1 | 10/2012 | Arcot et al. |

FOREIGN PATENT DOCUMENTS

| | | |
|---|---|---|
| EP | 2102598 | 1/2013 |
| WO | 2009071364 A1 | 6/2009 |
| WO | 2009071369 A1 | 6/2009 |
| WO | 2011003813 | 1/2011 |
| WO | 2011021776 A2 | 2/2011 |
| WO | 2011035427 A1 | 3/2011 |

OTHER PUBLICATIONS

Ford Motor Company, "SYNC," Owner's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem", Automotive Design & Production, Oct. 2003, http://findarticles.com, pp. 1-3.

News Release, "Chevrolet and OnStar Give Volt Owners 24/7 Connection and Control via Wireless Smartphone Application", released Jan. 5, 2010.

Josie Garthwaite, "GM's Volt to Launch With Cell Phone App for Remote Control", Jan. 6, 2010, printed from http:/gigaom.com/cleantech/gms-volt-to-launch-with-cell-phone-app-for-remote-controli, Dec. 30, 2010.

GM Onstar Mobile Demonstration Capability for Volt img. retrieved from: Hayes, JW, "GM OnStar App for Chevy Volt". Auto and Racing News, Jan. 6, 2010. <http://autoandracingnews.wordpress.com/2010/01/06/gm-onstar-app-for-chevy-volt/>.

BlackBerry Curve Series, BlackBerry Curve 9300/9330—Smartphones User Guide, Version: 6.0 (2011), pp. 144.

BlackBerry Curve Series, BlackBerry Curve 9300/9330—Smartphones User Guide, Version: 6.0 (2011).

Chinese Patent Office, First Office Action for the corresponding Chinese Patent Application No. 201110170422.X mailed Feb. 28, 2015.

\* cited by examiner ly, conservative or
defensive or energy-saving) is assumed.

METHOD AND SYSTEM FOR DETERMINING A ROUTE FOR EFFICIENT ENERGY CONSUMPTION

CROSS-REFERENCE TO RELATED APPLICATIONS

This application claims foreign priority benefits under 35 U.S.C. §119(a)-(d) to DE 10 2010 030 309.7, filed Jun. 21, 2010, which is hereby incorporated by reference in its entirety.

TECHNICAL FIELD

Various embodiments relate to methods and systems for route determination. In some embodiments, the determined route provides for an efficient use of energy consumption of a vehicle.

BACKGROUND

The selection of a route plays an important role in the minimization of the energy consumption of a motor vehicle. While there may be various criteria by which a route can be determined, navigation systems are most commonly configured in such a way that the shortest and/or the fastest route from a starting point to a destination is determined.

In some cases, it may be that the shortest route is the most efficient with respect to energy consumption. However, if the shortest route leads through an urban area, for example, where increased energy consumption arises due to frequent traffic-related stopping and starting, the route may be less energy efficient. Further, the attributes of the route, such as the permissible speed, interruptions in the traffic flow due to traffic regulations (such as traffic light, stop signs, pedestrians, etc.), the differences in altitude, and the properties of the vehicle and/or the driving behavior of the driver may also have an effect on the efficiency of the vehicle's energy consumption.

Various examples exist of methodologies for determining an energy efficient route. For example, U.S. Pat. No. 5,913,917 discloses a method for estimating the energy consumption of a motor vehicle during a journey from a starting point to a destination along a predefined route in order to estimate the range of an electrically or conventionally operated motor vehicle. In this context, the predefined route is split into segments within which the conditions such as maximum speed, gradient, etc. are constant, and the segments comprise a maximum one intersection or junction. On the basis of data about the gradient, vehicle speed, anticipated traffic density, weather conditions, etc., a fuel consumption value is determined for each segment, with a predefined driving style of the driver also being taken into account. The sum of the consumption values which are determined for the individual segments constitutes the entire predicted fuel consumption on the predefined route.

As additional examples, DE 102007059120 A1 and DE 102007059121 A1 disclose methods for determining an energy-consumption-optimized route from a starting point to a destination, wherein energy consumption values are assigned to at least some of the elements of map data which model a traffic route network and which have an acceleration-dependent and/or speed-dependent component. In order to detect driver-specific influences, one of a plurality of predefined possible driving styles (sporty, conservative or defensive or energy-saving) is assumed.

SUMMARY

One aspect relates to a system for optimizing energy consumption in a vehicle along a route. The system includes at least one vehicle computer configured to receive data defining one or more routes. The vehicle computer is also configured to receive one or more consumption influencing parameters which influence a consumption of an energy source of the vehicle along the one or more routes. Based on the route data and the consumption influencing parameters, at least one route which minimizes the consumption of the energy source for the vehicle may be determined. For the at least one route, one or more braking strategies (e.g., and without limitation, at least one of regenerative braking, conventional braking, engine braking, coasting, and shutting down the engine of the vehicle when in a stationary state) may be determined for implementation by a vehicle operator in the vehicle in accordance with reducing the consumption of the vehicle energy source. The one or more braking strategies may be output in the vehicle.

Another aspect include a computer-implemented method for optimizing energy consumption in a vehicle along a route. The method may include receiving data defining one or more routes at a vehicle computer. Further, one or more consumption influencing parameters which influence a consumption of an energy source of the vehicle along the one or more routes may be received at the vehicle computer. Based on the route data and the consumption influencing parameters, at least one route which minimizes the consumption of the energy source for the vehicle may be determined. For the at least one route, one or more braking strategies may be determined at the vehicle for implementation by a vehicle operator in the vehicle in accordance with reducing the consumption of the vehicle energy source. The one or more braking strategies may be output (e.g., and without limitation, at least one of a haptic output, acoustic output, or optical output) in the vehicle.

Another aspect relates to a device for optimizing energy consumption in a vehicle along a route. The device may be configured to receive data defining one or more routes. The device may also configured to receive one or more consumption influencing parameters which influence a consumption of an energy source of the vehicle along the one or more routes. Based on the route data and the consumption influencing parameters, at least one route which minimizes the consumption of the energy source for the vehicle may be determined. For the at least one route, one or more braking strategies may be determined for implementation by a vehicle operator in the vehicle in accordance with reducing the consumption of the vehicle energy source. The one or more braking strategies may be output in the vehicle.

BRIEF DESCRIPTION OF THE DRAWINGS

The figures identified below are illustrative of some embodiments of the invention. The figures are not intended to be limiting of the invention recited in the appended claims. The embodiments, both as to their organization and manner of operation, together with further object and advantages thereof, may best be understood with reference to the following description, taken in connection with the accompanying drawings, in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components.

Therefore, specific structural and functional details disclosed herein are not to be interpreted as limiting, but merely as a representative basis for teaching one skilled in the art to variously employ the present invention.

Additionally, the disclosure and arrangement of the figures is non-limiting. Accordingly, the disclosure and arrangement of the figures may be modified or re-arranged to best fit a particular implementation of the various embodiments of the invention.

It has been recognized that the braking habits of a vehicle driver can significantly influence the energy consumption of the motor vehicle and, additionally, on the identification of energy efficient routes. It can also outweigh an acceleration strategy.

Within the scope of the present application, "energy" refers to an energy source for a vehicle including, but not limited to, gasoline, battery, and electrical energy. Further, vehicles may include combustion engine vehicles (e.g., gasoline-powered vehicles), hybrid vehicles, electric vehicles, and the like.

Figure 1:
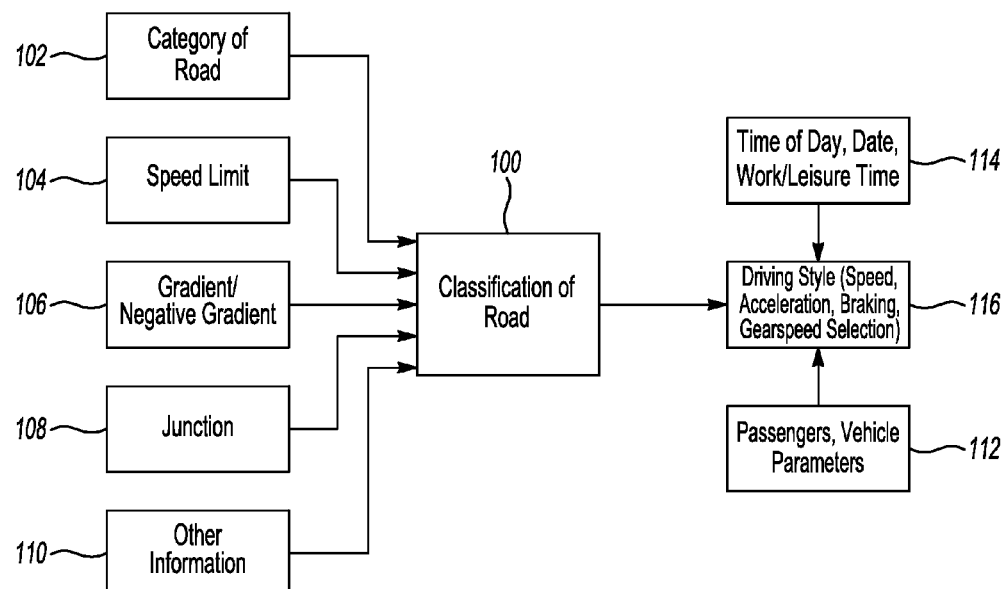
FIG. 1 shows a block diagram of the process and vehicle system modules used for determining a driver-specific driving style according to one of the various exemplary embodiments.

FIG. 1 illustrates a block diagram of the system modules and process for determining a driving style of a vehicle driver which may be one factor in determining an energy efficient route. As part of this determination, the route being travelled (or will be travelled) may be classified (block 100) according to various segments of the route. The classification may be determined from data obtained from vehicle modules and/or sensors (as described below). In one embodiment, a route from a starting point to a destination may be determined on the basis of navigation (e.g., map) data.

For these routes and/or for a plurality of possible routes, an energy consumption status may be determined/predicted for the route(s). In this context, one or more possible influencing variables can be taken into account. The respective route may be divided into individual elements or segments for which information is respectively contained in the map data. By taking into account the influencing variables, the energy consumption of the vehicle, when the respective segment is traveled through, may be determined. Each of the energy consumption values which are assigned to the individual elements or segments of a route may be summed to provide the energy consumption for the route.

On the basis of the energy consumption which is assigned to the at least one route, it may be determined whether the route is optimum in terms of energy consumption. In one embodiment, the respective predicted energy consumption can be determined for a plurality of possible routes, and an energy-consumption-optimized route can be determined based on a comparison of the energy consumption values of each route. The energy efficient route may be a route (e.g., determined from the starting point to the destination) which has the smallest overall energy consumption among the possible routes which are determined.

Additionally or alternatively, an energy efficient route may be one which is optimized in terms of the energy consumption based on various criteria or constraints (as described below). As one non-limiting example, travel time may be to be taken into account such as a maximum required time. Alternatively or additionally, traffic regulations may be taken into account such that, for example, traffic constraints may be excluded from the determination. For example, toll-paying sections of a road may be excluded. In this context, such conditions can be included as fixed exclusion criteria and/or can be included in a weighted combination with the energy consumption. For brevity, tolls have been provided as an example, however one or more other constraints in addition to, or as an alternative to, tolls may be used in the determination.

Referring to FIG. 1, a driving style of a driver may be determined by recording driving data as a function of relevant parameters. The current location and the current direction of travel of the motor vehicle may be obtained from a GPS-assisted navigation system (not shown) as an example such as from the map data stored in a storage medium. The map data may reveal the part of a traffic route network on which the motor vehicle is currently located and the direction in which it is moving.

The map data may include, for each part of a route, parameters for defining or classifying the respective part of the route. Non-limiting examples of such parameters may include, but are not limited to, the category of the road 102 (e.g., and without limitation, suitability for traffic, the covering, the width of the road, etc.), the speed limit 104 based on the respective route portion, the respective direction of travel, and/or other traffic regulations, and the gradient 106. Additionally, the parameters may include information about intersections, junctions, priority regulations, traffic lights, and the like (block 108).

As represented by block 110, other parameters may also be included. In some embodiments, the parameters may additionally include topographical information such as height above sea level and bend radius. As a non-limiting example, the parameters may include information as to whether the respective portion or segment is located in an area which is inside a locality or outside a locality. If the route portion contains more than one bend, information about the number of bends and an average bend radius or the minimum bend radius may also be included.

Based on the route parameters, a classification of the road which is currently being traveled on, which may be unidimensional or multidimensional, may be derived or determined. The classification, as such, may be at least one input to determining the driving style of the vehicle driver (block 116).

Other inputs to determine the driving style may include operating parameters of the motor vehicle as obtained from other modules and/or sensors of the vehicle (block 112). Such parameters, which may be recorded with the travel parameters, may include, but are not limited to, speed, acceleration, braking deceleration, gearshifting, gearspeed selection, idling times, the number of passengers and/or cargo and the like.

Additional input(s) may include time, date, and destination of the motor vehicle (block 114). Traffic-related parameters or ambient parameters may also be collected and used as the basis for the determination of the driving style of the driver.

The driving style of the driver is determined from one or more of the non-limiting examples of data described above which may be recorded continuously. The driving style may be configured, for example, as a function, a characteristic diagram, or as a unidimensional or multidimensional classification. The driving style may indicate, for example, which behavior the driver exhibits as a function of one or more of the various parameters. As a non-limiting example, the driving style may indicate which speed the driver is trying to reach or seeking to maintain given a certain combination of parameters and which measures the driver is taking with regard to acceleration or deceleration. It is therefore possible, for example, for intersections, stop signs or roundabouts to define a driver-specific braking behavior or acceleration behavior. In the case of braking and acceleration, a specific driver may exhibit a specific gearshifting behavior and gear selection behavior. When driving at a constant speed, a specific driver may prefer a specific gearbox transmission ratio which may be different inside a locality than outside a locality. The driver may also exhibit a different behavior as a function of the time of day or the destination.

Accordingly, a driving style (and the associated speed strategy, acceleration strategy and braking strategy) may be based on a road classification in addition to a number of influencing variables. As such, a realistic prediction of the behavior of the driver may be facilitated and an estimation of consumption on a route segment and/or on a route may be determined.

The predicted energy consumption for a route may be determined based on a driver-specific driving style. The driving style of the driver may influence energy consumption when a given route is travelled. The driving style of the driver can have different effects on energy consumption in different situations. For example, the same driver in town traffic can have a different driving style than on a country road or on a freeway. For this reason, a route which is favorable in terms of energy consumption for one driver may be energy inefficient for another driver. Accordingly, using a driver-specific driving style in the determination of the predicted energy consumption for a route can provide a more precise determination of an energy-consumption-optimized route.

Figure 2:
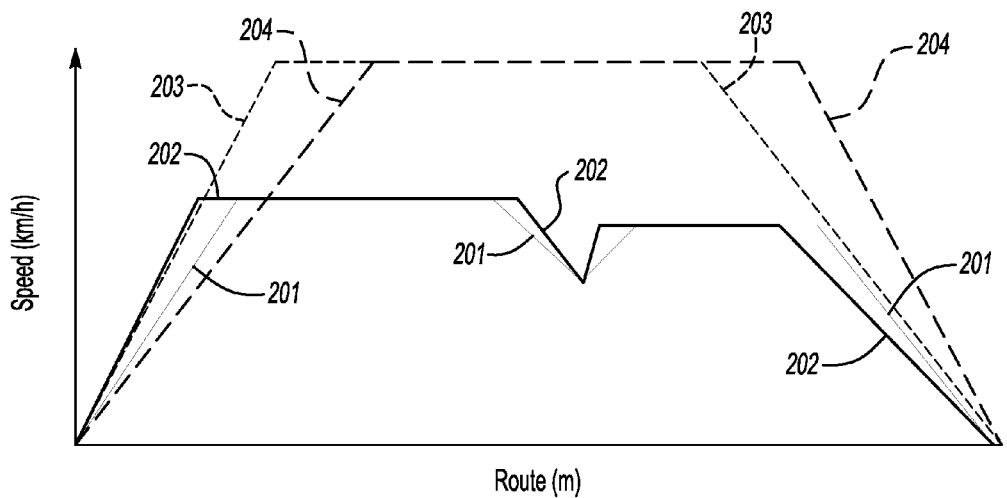
FIG. 2 shows an example of two different driving styles.

As an example, FIG. 2 provides a comparison of two different driving styles in order to illustrate the effect of driving style of energy consumption. The thin line 201 shows the behavior of driver A and the thick line 202 represent the behavior of driver B, each for traffic within a locality or urban traffic. The dashed lines respectively show the behavior of driver A (line 203) and driver B (line 204) on a road with traffic outside a locality or on a freeway. As shown in FIG. 2, driver A accelerates in traffic outside a locality more quickly than in traffic inside a locality, while the behavior of driver B is the opposite. Driver A brakes in traffic inside a locality with virtually the same braking acceleration as in traffic outside a locality while driver B selects stronger braking in traffic outside a locality than in traffic inside a locality.

The different acceleration strategies and braking strategies can be differentiated not only according to those inside a locality or those outside a locality but also according to a multiplicity of further conditions which influence the energy consumption directly and/or through the effect on the driving style. This aspect will be described in further detail with respect to FIG. 3.

Energy consumption predicted for a route may be based on a braking strategy. The braking strategy may be taken into account in determining energy consumption of the individual elements or segments of the route. Accordingly, an improvement in the accuracy of the estimation of the energy consumption and in the accuracy of the determination of an energy efficient route may be provided.

In one embodiment, the braking strategy may include determining which of one or more type of braking to activate. The types of braking may include, for example, a service brake, an engine brake, and/or an electro-motive brake of the motor vehicle. As one example, the type of braking to use may be determined when, for example, reducing the speed of a vehicle. In some cases, it may be more energy efficient to use a system for energy recovery (e.g., regeneration) from the kinetic energy of the motor vehicle instead of the service brake of the motor vehicle (which is usually activated by means of a brake pedal). In this case, the system may be used by increasing the output voltage from, for example, a dynamo in order to charge a vehicle battery or by using a specific electro-motive brake. In other cases, it may be beneficial to convert the vehicle's potential energy on a negative gradient into usable energy of the motor vehicle.

In another case, the use of the braking effect of the engine (e.g., "engine braking") may have an effect on energy consumption. In this case, an internal combustion engine continues to operate during engine braking without consuming fuel (in contrast to idling mode, for example). It may be also possible to regulate the engine temperature which is important for the efficiency of the combustion. In yet another case, it may be more favorable for a vehicle to coast during a reduction in speed or in the event of a full stop rather than maintaining the speed until just before a reduction in speed or a full stop when active braking commences.

The type of braking (e.g., deceleration) that is more efficient for energy consumption may depend on, for example (and without limitation), an initial speed from which braking occurs, the target speed to which braking occurs, the consumption in the braking phase, and the distance from the travel point at which the reduced speed is to be achieved.

The braking strategy may be a function of one or more characteristics of the route. These may include a positive and/or negative gradient of the road, speed, and/or the distance from a travel feature which could bring about a change in speed such as (and without limitation) a bend, a speed limit, or a traffic light. Further, these conditions may be dependent on the surrounding situation (e.g., environmental factors) and/or the traffic situation. For example, the ability of a vehicle to coast in dense traffic or when visibility is poor is more difficult than in light traffic.

In some embodiments, the service brake may have conditions under which the engine may shut down. Such conditions may include, for example, a minimum standing time which, if exceeded, causes the vehicle engine to be shut down. Other conditions may exist which have not been explicitly stated for purposes of brevity.

Identifying the type of braking to use may additionally be performed when predicting the energy consumption for a route. For example, the consumption may be predicted based on topographic information about the route such as bends, negative gradients, and speed limits and, further, the use of the various braking methods as determined from the topographic information. Additional information that may be used may be traffic-related braking situations by assuming corresponding probabilities. Accordingly, a predicted consumption and a route that optimizes consumption can be determined.

Figure 3:
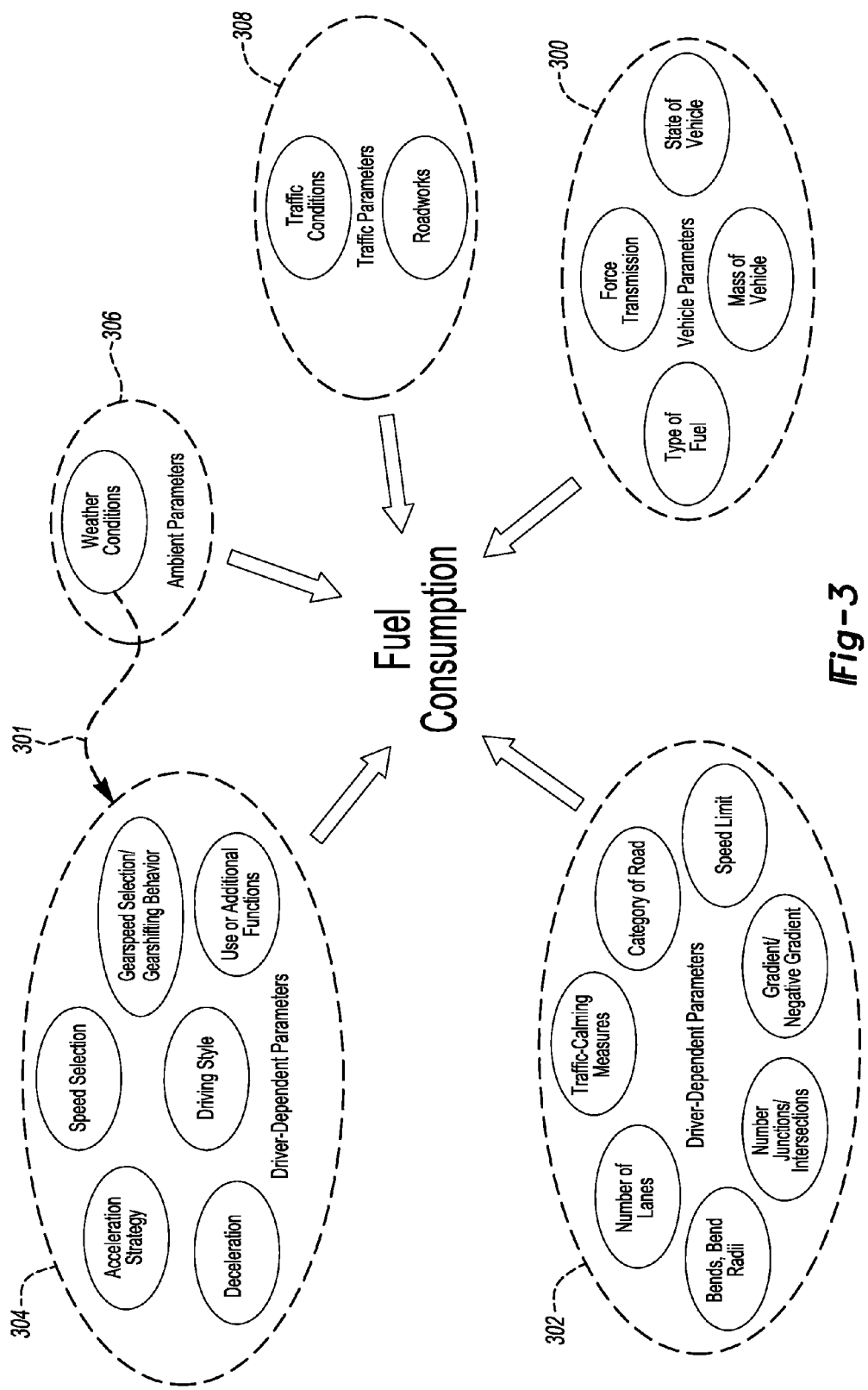
FIG. 3 is a data flow diagram of the various influencing variables for the energy consumption and the relationships thereof.

FIG. 3 is an exemplary illustration representing the data flow of various influencing variables which play a role in the calculation of the energy consumption. As shown in FIG. 3 for clarity, the respective influencing variables are divided into groups of vehicle parameters 300, road parameters 302, driver-specific parameters and/or driving style 304, ambient parameters 306 and traffic parameters 308. FIG. 3 is non-limiting such that the groupings and/or the elements of the groupings can be rearranged and modified. Further, one or more parameters (or set of parameters) may be added to or removed from the set of parameters of FIG. 3.

As represented by the dashed arrow 301, there may be relationships between the individual influencing variables and/or groups of influencing variables. For example, the weather conditions may not only have a direct influence on the fuel consumption on a route segment (for example, due to an oncoming wind or particularly high temperatures or low temperatures), but may also have an indirect influence on the fuel consumption vis-à-vis the driving style of the driver. As a non-limiting example, the driving style may be dependent on the weather conditions such as visibility. Although not illustrated, one or more of the other parameters, such as state of the road, the travel-dependent parameters, route-dependent parameters, and the vehicle parameters may also influence the energy consumption directly and/or indirectly via the driving style of the driver.

A driver's specific driving style may include an individualized braking behavior (group 304). For example, a driver may use a service brake, engine brake, regeneration, or shut down the engine when the vehicle's in a stationary state. Thus, this braking behavior may be taken into account such that, depending on the driver or driving style, it may occur in different situations and at different frequencies. Thus, the energy consumption may be predicted based on the driver-specific braking behavior.

In one embodiment, the driver-specific driving style may be based on the selection of the gearbox transmission ratio, for example, as a function of when the vehicle is travelling at a constant speed and of the speed, acceleration and/or deceleration during accelerated travel or braking The gearbox transmission ratio may also effect the engine brake or energy recovery. In addition, the driving style may be based on the engagement and disengagement of the clutch, which can also have an effect on the consumption as a function of the gearshifting processes. The driving style for the driver can also be based on stationary state operating mode information or idling operating mode information. As an example, the information may be provided with respect to engine shutdown in the case of a relatively long stationary state. Such information may provide a more accurate determination of the energy-consumption-optimized route for different types of vehicle, particularly for vehicles with a manual gearbox.

A driver-specific driving style may be a function of the driving environment. Thus, the driving style of a driver may be be influenced by a number of factors which can act differently on different parts or segments of a route. In this case, more accurate estimation of the energy consumption can be obtained on the respective part or segment and on the entire route.

In one embodiment, the driver-specific driving style can be route-dependent, e.g., it can be different for various segments of one or more routes. In this way, the energy consumption prediction for the driver and/or the energy-efficient route determination, may take into account, for example, that a driver on a freeway can have a different driving style than when on a country road which has many bends, on a narrow secondary road or in town traffic.

In some embodiments, from the route-dependent information, it may be determined whether the driver is on his way to or from work or is traveling in his leisure time. Each may have different time pressures and, as a result, the driving style of the driver can be influenced. Thus, the driver-specific driving style can depend on time. For example, the time of day or the day of the week may determine whether the driver is making a work-related journey or is traveling in his leisure time. The driving style can also depend on the time at which the motor vehicle is predicted to pass through part of a route or of a route segment since the driving style of the driver may be completely different in dense traffic than in light traffic. Such information may be determined on the basis of the time or from the current traffic situation.

In additional or alternative embodiments, weather conditions and the weather-related road conditions may also influence the driver-specific driving style. For example, when the visibility is poor, the driver can exhibit a quite different driving style, owing to fog or precipitation, than when the visibility is good. Likewise, the driver's visibility may be effected by snow or rain. Drivers may adapt their driving style to the conditions in respectively different ways. Accordingly, based on the driver-specific driving style as a function of the respective conditions of a specific route segment, an energy consumption and/or route determination may be achieved.

In addition, the driving style of the driver may also depend on current vehicle parameters. For example, the cargo of the vehicle plays a role not only for the consumption of the motor vehicle on a given segment but also for the driving style of the driver. For example, the driver may use the permitted maximum speed when the cargo is increased than when the vehicle is empty. Further, the driving style may also depend on whether the driver is traveling alone or whether a front seat passenger is also traveling in the vehicle. The driving style may additionally or alternatively depend on how many other passengers or which other passengers are present. The same also applies to a trailer operating mode which influences not only the permitted maximum speed but also the driving style of the driver. The gearspeed selection may also depend on the vehicle parameters. Since a driver may react in different ways to changes in, for example, the cargo of the vehicle, taking into account the driving style as a function of the current vehicle parameters provides a more fine-tuned estimation of the predicted consumption on a route. Correspondingly, a more fine-tuned determination of a consumption-optimized route may also be achieved.

Figure 4:
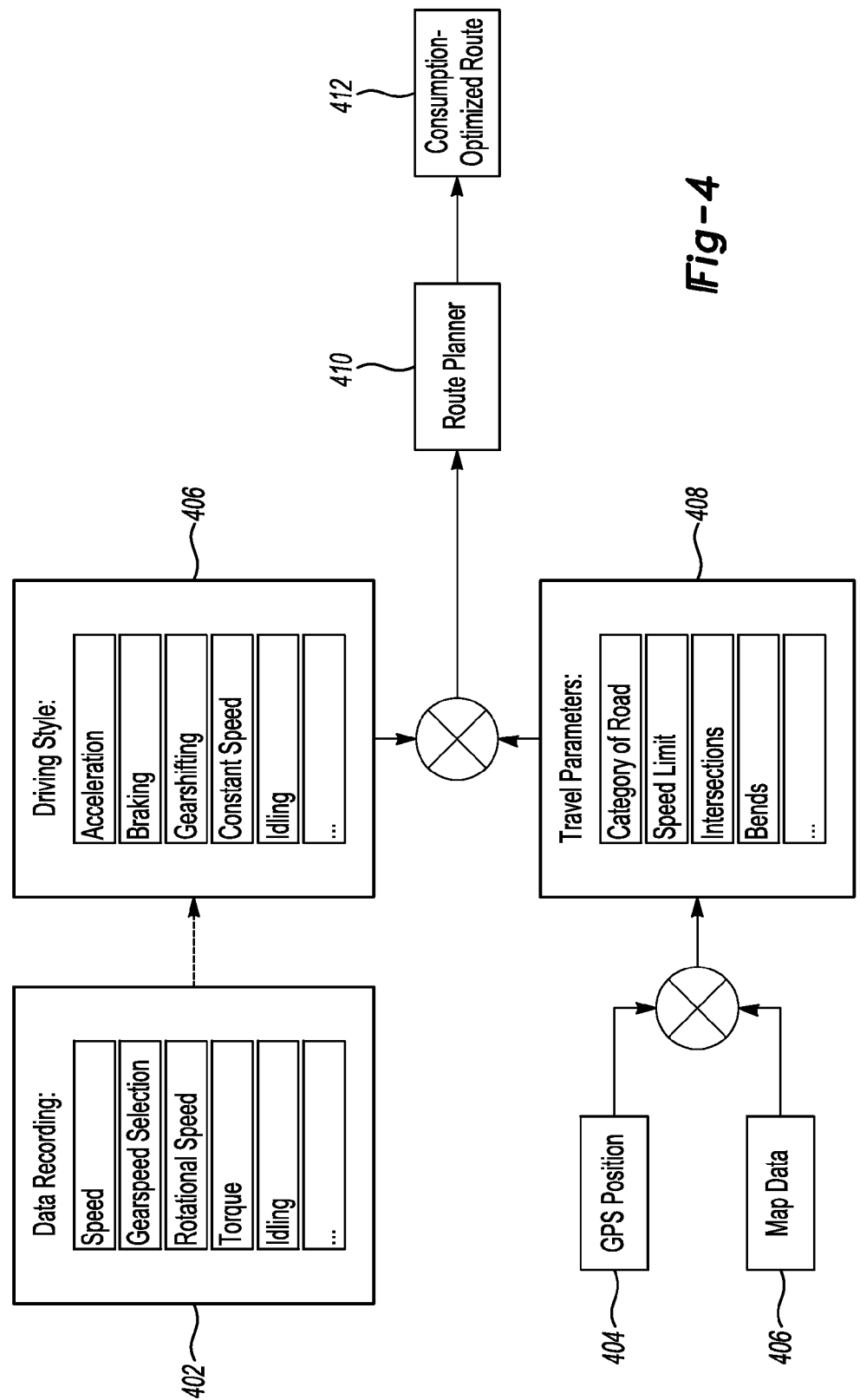
FIG. 4 is a block system diagram illustrating the data flow during the determination of an energy-consumption-optimized route.

Referring now to FIG. 4, which is an exemplary illustration of a system and data flow for determining an energy-efficient route, data may be recorded at the vehicle 402 during the operation of the motor vehicle in order to determine the driving style of the driver. The recorded data may provide the basis for one or more of the travel parameters, ambient parameters, traffic parameters and vehicle parameters which are used to track/monitor the driving behavior of the driver.

As one example, a current position of the motor vehicle may be recorded as determined by a GPS system 404 and travel parameters or characteristics of a travel segment as determined from map data 406. The current time and/or the ambient parameters, traffic parameters and vehicle parameters may also or alternatively be recorded. Further, the driving style 406 such as the driver's accelerating and braking actions, the speed being traveled at and the activation of the gearshift and, in some embodiments, further consumption-related additional functions of the motor vehicle such as a conditioning system or a window, may be recorded. Such data may be collected in order to determine the driving style of the driver as a function of the environmental situation in order to determine the actions of the driver based on the conditions and the characteristics of a travel segment. The driving style of the driver may be determined under conditions which are as different as possible and for as many different travel parameters as possible. This personal driving style may be stored and used in the estimation of the predicted energy consumption on a route segment or a route.

In order to determine a consumption-optimized route, the relevant travel parameters may be determined for a multiplicity of segments of a possible route from the starting point to the destination from the stored map data 406. In this context, the route and the segments of the route may be determined based on the map data 406, the current position determined by a GPS receiver 404, and to the destination which has been input, for example, by the driver. It will be appreciate that, in FIG. 4, only some of the relevant parameters are specified by way of example.

The driver may be identified using the recorded operating data 402 of the motor vehicle such as speed and gearspeed selection over a travelled route section as determined from the driving style. In some embodiments, a route section of a few hundred meters may be sufficient for identifying the driver and/or the driving style. Certainly, the unit of measurement is not limiting and others may be used according to the specific implementation of the invention. The additional calculations may be based on stored data about the driving style of the driver.

In some embodiments, the driving style of the driver may additionally or alternatively determined and/or updated by recording and evaluating the operating data together with one or more parameters such as (and without limitation) the travel parameters. If a deviation from a stored driving style is determined, a new route optimization may be triggered based on the changed traffic situation. As an example, a new route may be determined based on a change in traffic density.

Consumption values for the respective segments may be calculated from the travel parameters 408 together with the driving style of the driver 406. It may be determined for a segment (e.g., based on the travel parameters) whether acceleration or braking is necessary and, in some embodiment, with what probability. Further, a permissible speed may be determined. From this information, a predicted consumption value for the respective segment may be determined based on at least the driver-specific driving style. In some embodiment, the determination may be made base on additional data/parameters such as, for example, vehicle parameters and current or predictive ambient conditions and traffic parameters (not illustrated).

The consumption values for the individual segments may be input to a route-planning algorithm and a consumption-optimized route may be determined 410. In some embodiments, other inputs such as the predicted necessary time may be taken into account.

In some embodiments, the driver-specific driving style may be updated on the basis of data of a section of a route which was previous travelled. Based on the updated information, an energy-consumption-optimized route from a current location to the destination may be determined. As a result, a respectively up to date energy-consumption-optimized route may be be determined for the remaining travel to the destination at any time.

In one advantageous embodiment, the driver-specific driving style data may be transmitted or transferred from a first vehicle to a second vehicle. Suitable transmission/transfer means here are all data transmission methods including but not limited to a storage means, a cable connection and/or a wireless connection. A storage means may be, for example, a USB stick which the driver connects to a first vehicle which he is driving at a particular time. The driver can then also use the data collected from the first vehicle for a second vehicle by connecting the USB stick to a second vehicle and transferring the data collected on the USB stick to the second vehicle. Other non-limiting storage means may be an ignition key or the key card of the driver which store these driver-specific driving style data. The storage devices may also store access authorization.

In an additional or alternative embodiment, the driving style data may be transmitted directly from vehicle to vehicle by means of suitable long-distance transmission. In one embodiment, such transmission may be used if the same driver uses a plurality of vehicles which communicate with one another independently or in an intentionally triggered fashion, for example by the driver. In additional or alternative embodiments, the transmission may occur via a cable connection, for example when a nomadic device is charged at the socket.

If two or more drivers drive a vehicle, each may be identified by, for example, a corresponding encoded personal key or a personal code which is input when the motor vehicle or the navigation system starts. As another example, a driver may be identified by biometric identifiers such as (and without limitation) the determination of the weight of the person sitting in the driver's seat. As another example, a driver may be identified based on vehicle settings such as the driver's seat, the steering wheel, the seatbelts or the mirrors which may differ from individual to individual. Based on the settings, which may be made at the start of a journey, the personal and, in some embodiments, situation-dependent driving style of the driver may be retrieved from a stored driver profile which is used to determine the predicted consumption.

In another embodiment, identification of the driver can instead or additionally be carried out by evaluating the driving style on a route previously traveled and which may comprise a portion of the current or pending route. Where the driving styles of the various possible drivers are sufficiently different, each driver may be easily identified of the driver is possible for calculating a consumption value. Based on the identification, a previously determined driving style for the identified driver may be obtained and the dependence thereof on the road parameters, ambient parameters and vehicle parameters.

In one embodiment, identifying a driver may enable detecting a driver change during a journey. Additional non-limiting identifier of a driver change may be opening of the doors or shutting down of the motor. After the identification of a new driver, a current energy-consumption-optimized route is preferably determined for the travel from the current location to the destination on the basis of the driving style of the new driver.

If a driver cannot be identified, or if the motor vehicle is driving for the first time, the driving style of the driver can be determined on the basis of a part of the route which was previously travelled. Based on the previously travelled route, an energy efficient route may be determined for the remaining travel to the destination.

The various embodiments of the invention may be implemented as a device for determining an energy-consumption-optimized route of a motor vehicle from a starting point to a destination. The device may include an input means (for example a touchscreen) for inputting at least one destination and a storage means for storing map data. In some embodiments, the device may store additional data such as route data, data about driver-specific driving styles including data about corresponding braking strategies, data relating to the identification of the driver, vehicle data and/or characteristic diagram data for the determination of an energy consumption value for any desired segment of a route as a function of various parameters.

The device may additionally include a data collection means for collecting location data of the vehicle (e.g., the starting point or the current location of the motor vehicle as), weather data, data on the traffic volume and/or on the traffic situation, the time and the date as well as vehicle-related parameters such as cargo, tires, or roof structures. In addition, the presence of other passengers can be detected by means of sensors, which may be identified, in some embodiments, through biometric data. The data may be obtained, depending on the type of data, using one or more of a radio antenna (e.g., within a navigation system), a built-in clock, one or more vehicle sensors, or through a transfer system (as described above).

Furthermore, the device may comprise a processor means for evaluating the stored and collected data. Non-limiting examples may include a microcontroller or microcomputer. The device may also include a display means for displaying the energy-consumption-optimized route for the driver of the motor vehicle. Non-limiting examples include a display or an acoustic display. The processor means may be configured to determine an energy-consumption-optimized route which may be a more fine-tuned determination of an energy-consumption-optimized route from a starting point to a destination in a multiplicity of situations.

Since the segment-related consumption value and the energy consumption of a motor vehicle on a route depend on the type and the equipment level of the motor vehicle (on which the driving style of a driver also depends), the data stored in the storage means may be determined based on the type and the equipment level of the respective motor vehicle. Non-limiting examples of such data may include the data about driver-specific driving styles, vehicle data and/or characteristic diagram data.

In operation, for at least one possible route from a starting point to a destination, a braking strategy may be determined which produces a minimum (e.g., efficient) energy consumption for the respective route. The determined energy consumption for the respective route may be used in the determination of an energy-consumption-optimized route and the respective braking strategy can be controlled as the vehicle travels along the route. For example, in a motor vehicle with an automatic gearbox, the gearspeed selection may be actuated in order to use the engine brake in accordance with the optimum braking strategy. In addition, resources which facilitate the implementation of the respective optimum braking strategy may be transmitted to the driver through suitable haptic, optical and/or acoustic output means. If it is recognized through the location data, which may be recorded in real-time or near real-time, that a route which differs from the determined energy-consumption-optimized route is being travelled, a new optimum braking strategy may be determined thereby enabling actual energy consumption to be reduced.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
    determine a route which minimizes vehicle energy consumption, based on received route data and a received consumption influencing parameter that influences vehicle energy consumption;
    for the determined route, determine a vehicle energy consumption reduction braking strategy that relies on different energy preservation strategies correlating to different route portions; and
    output the braking strategy in the vehicle, changing output energy preservation strategies as correlated route portions are reached.

2. The system of claim 1 wherein the braking strategies include at least one of regenerative braking, conventional braking, engine braking, coasting, and shutting down the engine of the vehicle when in a stationary state.

3. The system of claim 1 wherein the processor is further configured to:
    segment the a possible route into a plurality of segments;
    determine a consumption value for each of the plurality of segments of the possible route; and
    determine whether the possible route minimizes the consumption of the energy source based on the consumption value for each of the plurality of segments.

4. The system of claim 3 wherein the consumption values for each of the plurality of segments are summed determine whether the possible route minimizes the consumption of the energy source.

5. The system of claim 1 wherein the consumption influencing parameter includes a driving style of a vehicle operator.

6. The system of claim 5 wherein the processor is configured to:
    identify the vehicle operator based on a vehicle operator identifier; and
    obtain the driving style of the vehicle operator once the vehicle operator is identified.

7. The system of claim 5 wherein the driving style includes a braking behavior of the vehicle operator, the processor being further configured to determine the one or more braking strategies in accordance with the braking behavior of the vehicle operator.

8. The system of claim 1 wherein the consumption influencing parameter includes a plurality of parameters including vehicle parameters, weather-related parameters, traffic parameters, and route-dependent parameters.

9. A computer-implemented method for optimizing energy consumption in a vehicle along a route, the method comprising:
    receiving at a vehicle computer data defining one or more routes;
    receiving at the vehicle computer one or more consumption influencing parameters which influence a consumption of an energy source of the vehicle along the one or more routes;

based on the route data and the consumption influencing parameters, determining at the vehicle computer at least one route which minimizes the consumption of the energy source for the vehicle;

for the at least one route, determining at the vehicle a braking strategy for implementation by a vehicle operator, having different energy preservation strategies correlated to different route portions; and outputting the braking strategy in the vehicle, including outputting the different energy preservation strategies as the correlated route portions are reached.

10. The method of claim 9 wherein the outputting includes outputting through at least one of a haptic output, acoustic output, or optical output.

11. The method of claim 9 wherein determining the route which minimizes the consumption of the energy source further includes segmenting the route into a plurality of segments;

determining a consumption value for each of the plurality of segments of the route; and determining whether the route minimizes the consumption of the energy source based on the consumption value for each of the plurality of segments.

12. The method of claim 9 wherein the consumption influencing parameters includes a driving style of the vehicle operator.

13. The method of claim 12 further comprising recording driving data for the vehicle operator for determining the driving style.

14. The method of claim 13 further comprising:

receiving driving data that deviates from the recorded driving data; and updating the driving style of the vehicle operator based on the deviating driving data.

15. The method of claim 12 further comprising storing at the vehicle computer the driving style for at least two vehicle operators.

16. The method of claim 12 wherein the driving style include a braking behavior of the vehicle operator, the method further comprising determining the one or more braking strategies in accordance with the braking behavior of the vehicle operator.

* * * * *